United States Patent
Loh et al.

(10) Patent No.: US 7,341,754 B1
(45) Date of Patent: Mar. 11, 2008

(54) COMBINATION CONDIMENT BEVERAGE DISPENSER

(76) Inventors: Bill Loh, 58 Goodman Road, Singapore (SG) 439081; Robert S. Smith, 1263 Emorg St., San Jose, CA (US) 95126

( * ) Notice: Subject to any disclaimer, the term of this patent is extended or adjusted under 35 U.S.C. 154(b) by 0 days.

(21) Appl. No.: 11/125,600

(22) Filed: May 9, 2005

Related U.S. Application Data

(63) Continuation-in-part of application No. 10/998,279, filed on Nov. 23, 2004.

(51) Int. Cl.
*B65D 77/00* (2006.01)
*A21D 10/02* (2006.01)

(52) U.S. Cl. .................. 426/115; 426/120; 426/112; 206/217; 206/541

(58) Field of Classification Search .......... 426/120, 426/115, 112, 85, 86, 124; 206/217, 541, 206/514, 223; 220/521, 705, 4.03, 709, 4.27
See application file for complete search history.

(56) References Cited

U.S. PATENT DOCUMENTS

| | | | | |
|---|---|---|---|---|
| 4,018,355 A | * | 4/1977 | Ando | 220/522 |
| 5,743,423 A | * | 4/1998 | Franco | 220/23.86 |
| 5,954,195 A | * | 9/1999 | Krueger et al. | 206/217 |
| 6,338,417 B1 | * | 1/2002 | Ferraro | 220/23.83 |
| 6,354,190 B1 | * | 3/2002 | Haydon | 99/323 |
| 6,364,102 B1 | * | 4/2002 | Gordon et al. | 206/217 |
| 6,425,480 B1 | * | 7/2002 | Krueger et al. | 206/217 |

* cited by examiner

*Primary Examiner*—Reginald L. Alexander
(74) *Attorney, Agent, or Firm*—Robert Samuel Smith

(57) ABSTRACT

A dispenser for condiments mountable on a container for a beverage wherein the container is any of a bottle and cups of several standard sizes. The dispenser comprises a circular base with a small inner cone having its largest rim integrally joined to the edge of a circular opening in the base. An outer cone formed as a series of steps is mounted on the base with the edge of the outer cone integrally joined to the edge of the base. The rim of a container for beverage supports any one of the steps depending on the size of the container. Alternatively, the dispenser is supported by a bottle container having a neck extending into the inner cone.

7 Claims, 6 Drawing Sheets

COMBINATION CONDIMENT BEVERAGE DISPENSER

CROSS REFERENCE TO EARLIER FILED APPLICATIONS

This application is a continuation-in-part of application Ser. No. 10/998,279 filed Nov. 23, 2004 from which priority is claimed.

FIELD OF THE INVENTION

This invention relates to condiment packages and particularly to a package that engages the top of a beverage container.

BACKGROUND AND INFORMATION DISCLOSURE

Situations are common where members of the public want a bite to eat and drink while they are engaged in other activities. Some such situations are when a person is driving a car, taking a walk, using the telephone, reading, socializing in a room full of people (at a party) etc. In any of these activities, the member of the public often wants to snack "on the run" because he/she hasn't the place or time to spend on more social amenities.

For such occasions, "finger food" is the order of the day—often a couple of handfuls of nuts, crackers, chips or donuts.

These snacks invariably generate a thirst—usually a popular beverage such as a Coke™, pepsi™, Dr. Pepper™, Gatorade™, etc The beverage industry distributes these beverages in any one of various sized containers—ranging from half pint cans to half gallon sized cartons.

The range of available sizes of containers is consistent with a market that includes small children and overgrown adults and everyone in between.

This is definitely NOT a case where one size beverage container fits all customers.

The market is always receptive to a novel idea such as a convenient way to snack. The "snack" industry has long been aware that novel and interesting packaging leads to increased market share.

SUMMARY OF THE INVENTION

It is an object of his invention to facilitate the activity of eating snacks and drinking beverage in circumstances where the diner does not have the convenience of sitting down at a table while drinking and eating "finger" food.

It is another object to provide a dispenser of both finger food and beverage in which the dispenser is held in only one hand.

It is another object to provide a container in which the container holds only finger food but in which the dispenser is mountable on a beverage container.

It is another object that the dispenser be adaptable to several beverage containers of a range of standard sizes.

It is another object that the dispenser be inexpensive.

It is another object that the dispenser be biodegradable depending on the material selected for its fabrication.

This invention is directed toward a "dish" shaped somewhat like the conventional flowerpot. The wall of the dish is a truncated cone of circular step sections mounted on a circular base panel.

The diameter of each step section is selected to enable setting the container on the rim of one of several standard beverage containers.

A smaller inverted cone is mounted concentrically on the base inside the dish. An opening in the center of the base permits mounting the dish onto the neck of a bottle such as are commonly used to dispense soft drinks (e.g., cocoa kola, pepsi cola, water, etc.)

The smaller cone has an opening in its small end permitting that a drinking straw be inserted through the hole into the beverage container.

DESCRIPTION OF A BEST MODE

Figure 1:
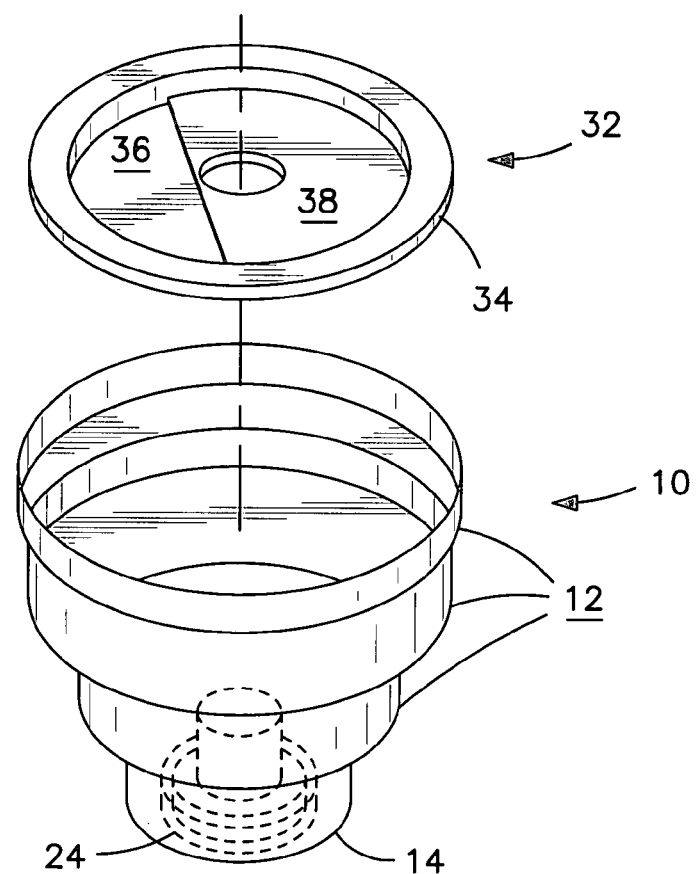
FIG. 1 is a perspective view of a version of the dispenser of this invention.
Figure 2:
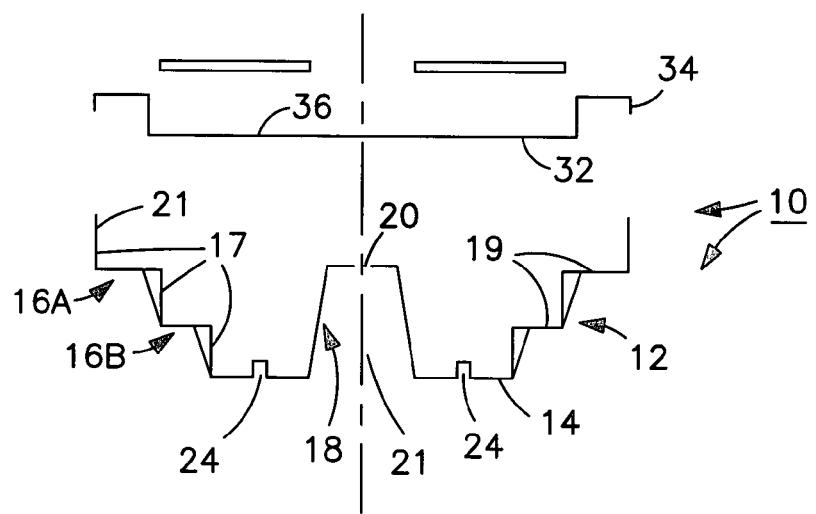
FIG. 2 is a sectional view of FIG. 1

Turning now to a discussion of the drawings, FIG. 1 is a perspective view showing the dispenser 10 of the invention. FIG. 2 is a sectional view of FIG. 1.

The dispenser 10 is a dish comprising an outer truncated cone 12 with its small end integrally joined to a base 14.

FIG. 2 is a sectional view showing the cone section 12 constructed as steps 16 A, B.

Each step comprises a riser surface 17 and a step surface 19. Each riser surface is a circular continuous flat band concentric with a centerline of the base 14. Each step surface 19 is a continuous band parallel to the centerline.

A smaller interior inverted cone 18 is integrally joined to the base 14 at a concentric opening 21 in the base 14. The interior cone 18 has an opening 20 in its apex.

FIG. 2 shows the base 14 having a concentric groove 24.

Figure 3:
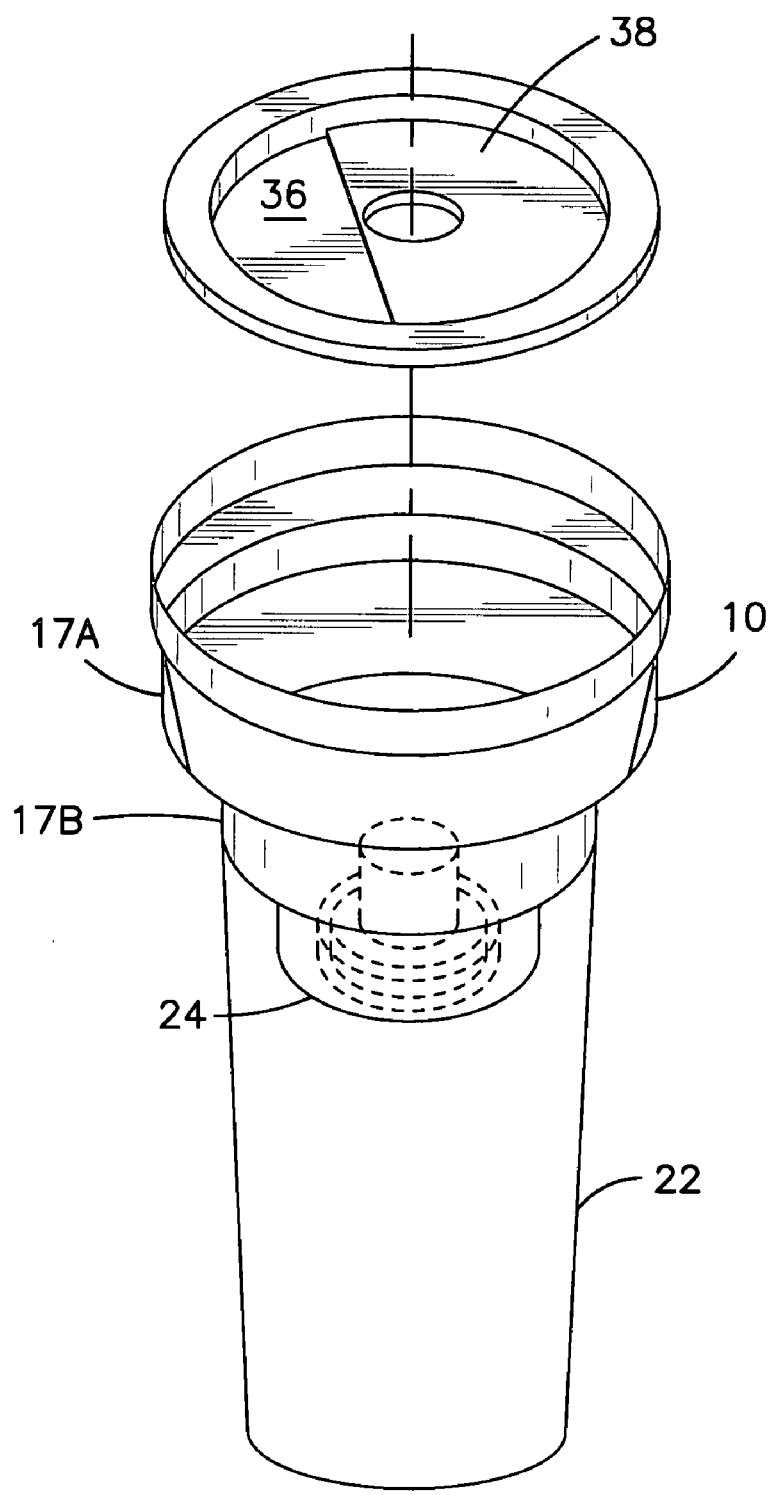
FIG. 3 is a perspective view of the dispenser mounted on a cup.

FIG. 3 is a perspective view showing the dispenser 10 mounted onto a container (cup) 22 of beverage. The steps 17A,B of the dispenser 10 are dimensioned so that the dispenser 10 is supported by surface 16B. on the rim of the container 22.

Figure 4:
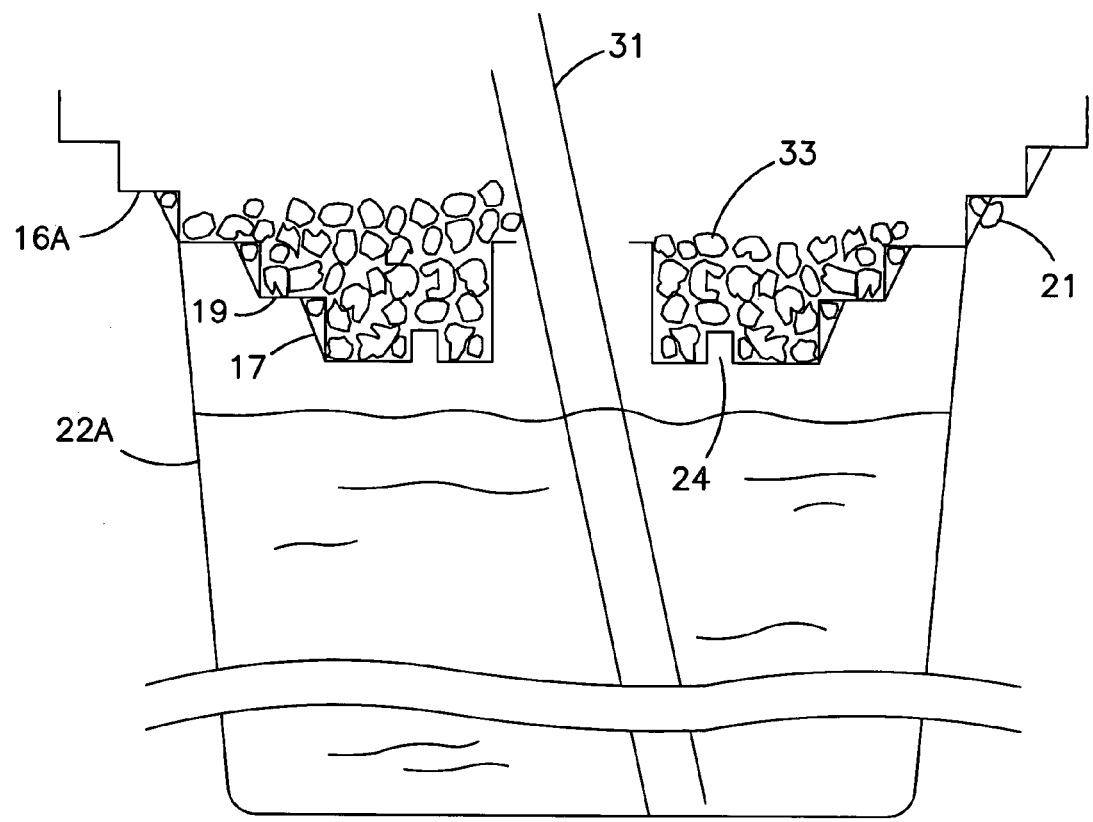
FIG. 4 is a sectional view showing he dispenser mounted on a large cup.

FIG. 4 is a sectional view of the dispenser 10 mounted on a large cup 22 A.

Figure 5:
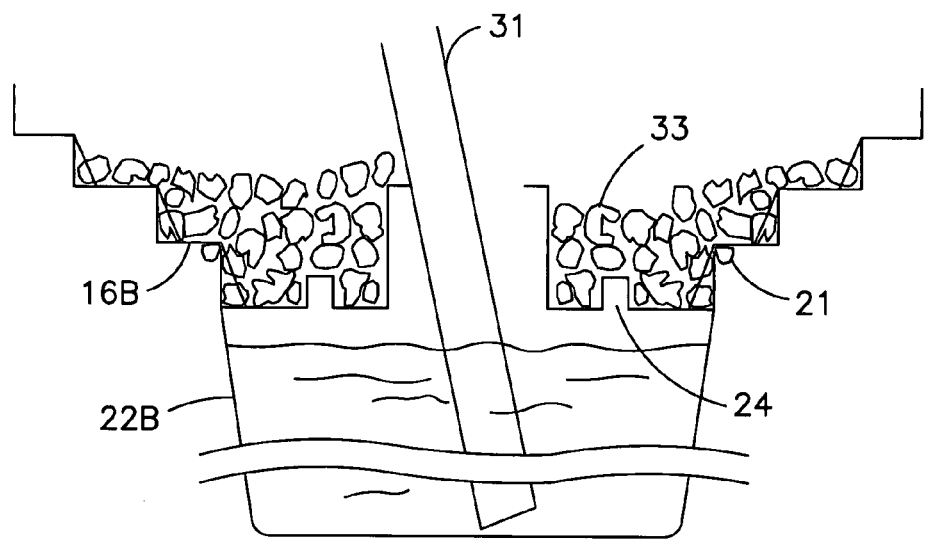
FIG. 5 is a sectional view showing he dispenser mounted on a small cup.

FIG. 5 is a sectional view of the dispenser 10 mounted on a small cup 22 B.

The riser surface 17 of each step 16 is tapered to match the taper of the cup and permit a snug fit of the dispenser 10 into one of three sizes of "standard" beverage cups beverage container The standard sizes of beverage cups are 64 fl. oz., 44 fl oz. 2 fl. oz.

FIGS. 1 and. 2 shows the base having a concentric groove 24.

Figure 6:
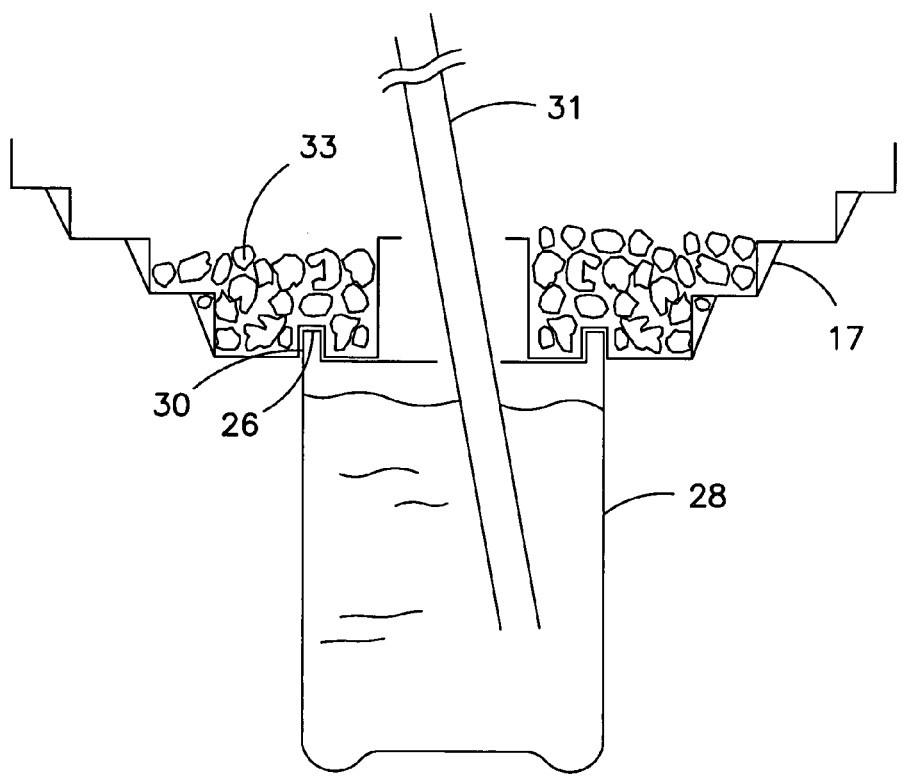
FIG. 6 is a sectional view showing the dispenser mounted on a can.

FIG. 6 shows the groove 24 dimensioned to enable press fitting the rim 26 of can 28 into the groove 24.

Figure 7:
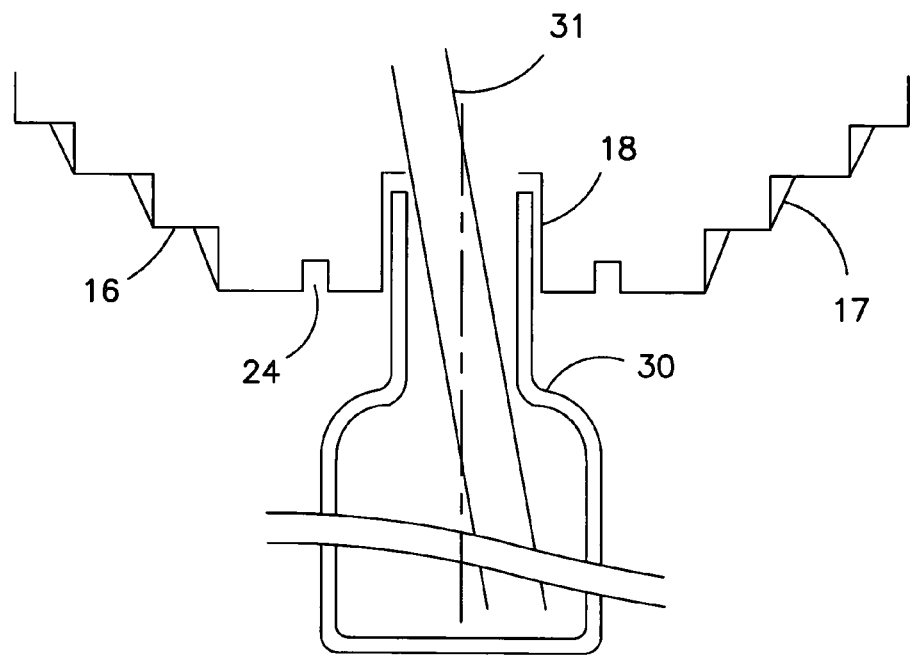
FIG. 7 is a sectional view showing the dispenser mounted on a bottle.

As shown in FIG. 7, the size of the small cone 18 is selected to enable mounting a standard beverage bottle 30 into the cone 18.

In summary, the dispenser 10 is dimensioned to fit the dispenser 10 on to a beverage cup having any one of four sizes, a beverage can or a beverage bottle.

As shown in FIGS. 4, 5, 6 in use, condiments 33, such as nuts, chips or crackers are stored in the dispenser 10. Dispenser 10 is mounted on the beverage container 28. A drinking straw 31 is inserted through the opening 20 in the small cone 18 into the beverage container 28.

The user is thereby enabled to hold the combined beverage container and dispenser 10 in one hand, drink through the straw 31 or take nuts 33 out of the dispenser 10 with the other hand. This is a great convenience for one who is not seated at a table.

FIG. 1 shows a circular lid 32 with a shoulder 34 dimensioned to enable pressing the lid 32 onto the rim 21 of the dispenser 10. The circular lid 32 has a depression 36 dimensioned to permit storing a CD disk 38 into the depression 36. (Disk is cut away in FIG. 1) The CD disk 38 is retained in the depression by film (not shown) that extends over the lid and is secured to the rim of the disk 38.

The inclusion of the CD disk 38 with the dispenser 10 is an added attraction for marketing the dispenser 10 containing condiments particularly to the younger members of the market.

Figure 8B:
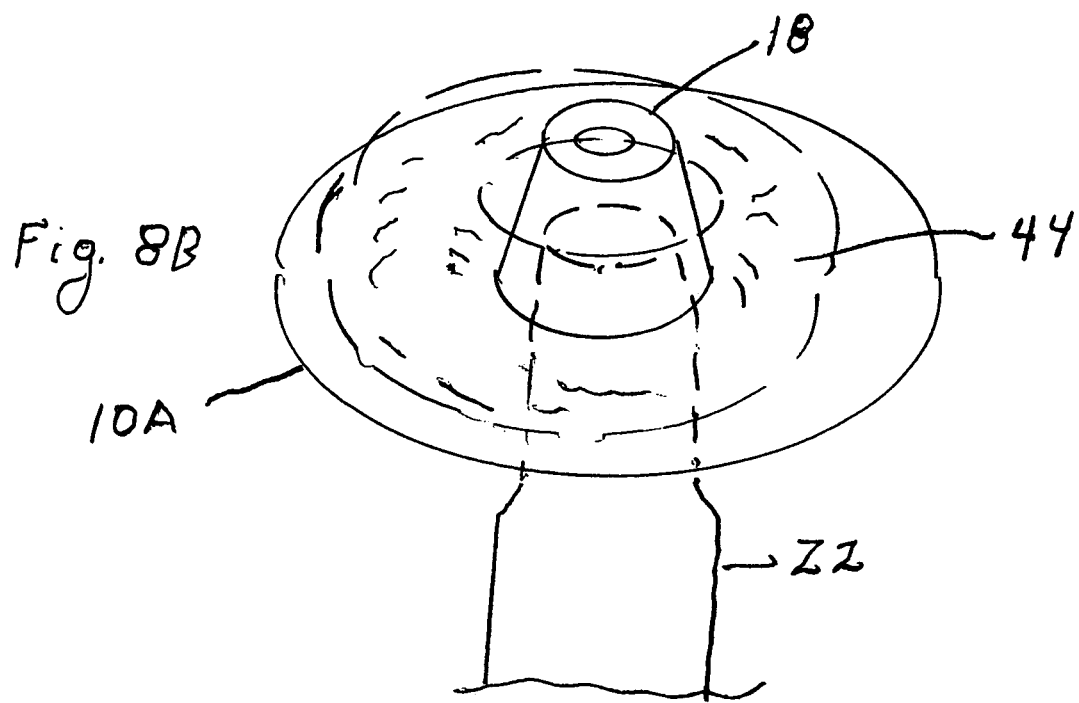
FIG. 8B shows a doughnut mounted on the dispenser of FIG. 8A and the dispenser of 8A mounted on a bottle.
Figure 8A:
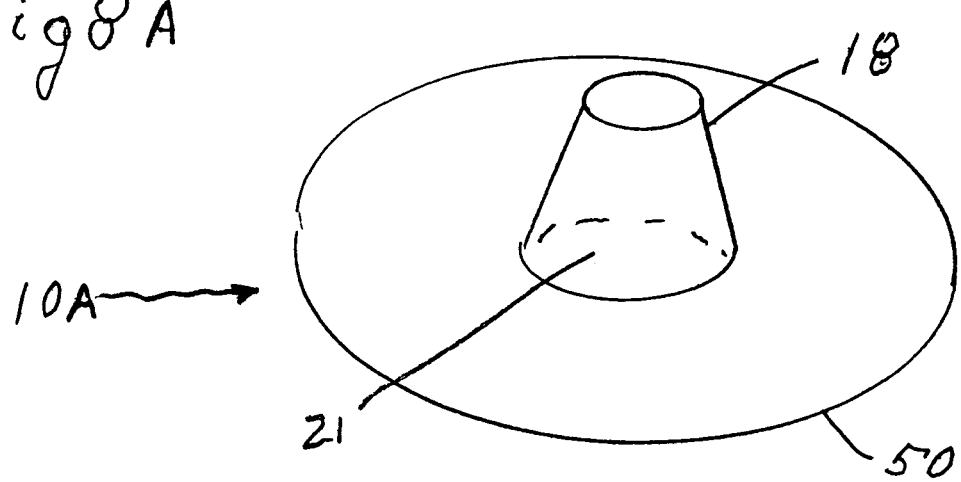
FIG. 8A shows another version of the dispenser.

FIGS. 8A, B show another version of the invention in which the dispenser 10A is adapted for dispensing a doughnut 44. The donut 44 is shown in phantom in FIG. 8B.

There is shown a base 50 with a small cone 18 mounted over an opening 21 in the base 50.

FIG. 8B shows a doughnut 44 (in phantom) positioned on the dispenser 10A with the small cone 18 extending through the central hole in the doughnut 44.

Figure 9:
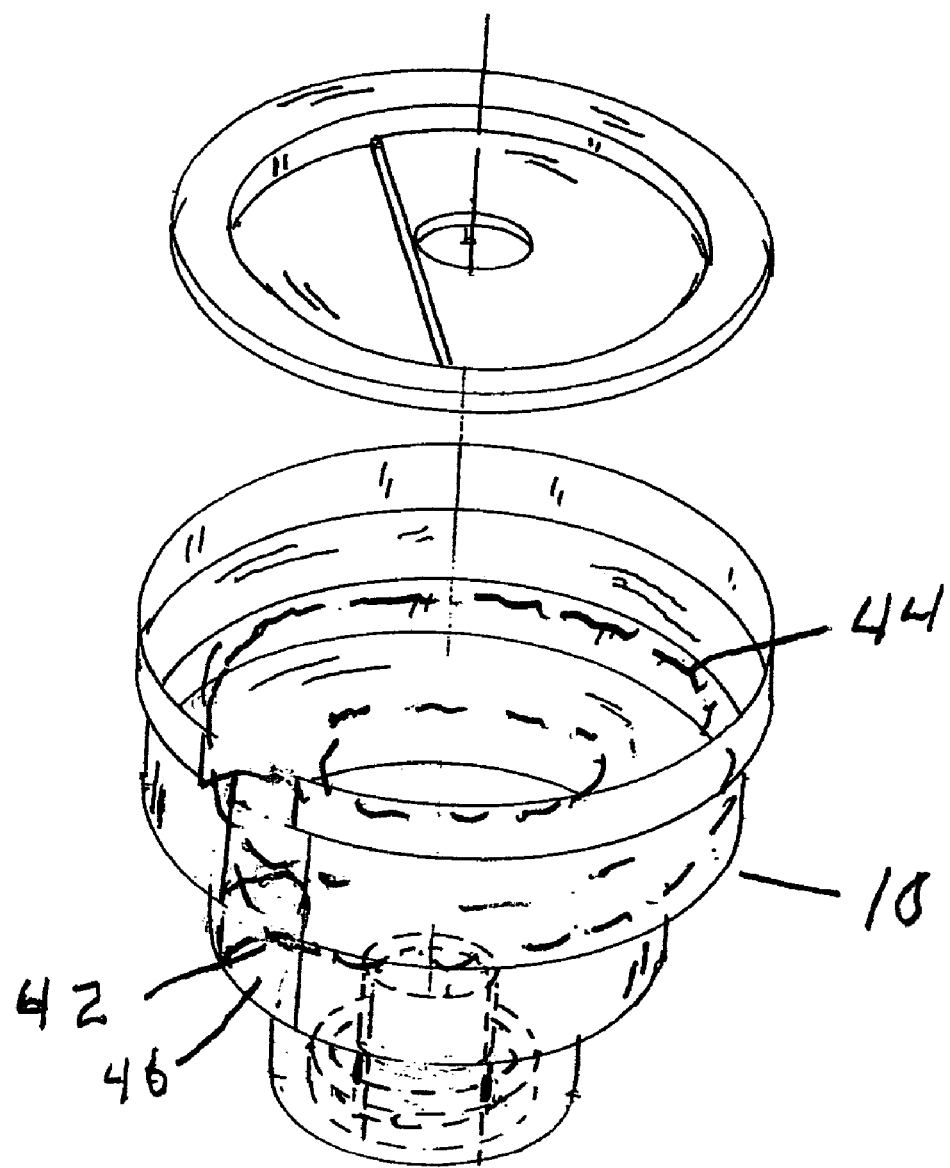
FIG. 9 shows the dispenser of FIG. 1 with a cutaway for accessing a doughnut positioned in the dispenser.

FIG. 9 shows the dispenser of FIG. 1 modified to hold a doughnut 44. The doughnut is shown in phantom in FIG. 9.

The modification in the dispenser 10 is a side opening 42 that permits withdrawing the doughnut by removing the lid 32, grasping the doughnut 44 between the thumb and forefinger and lifting the doughnut 44 out of the dispenser.

In this version, a small sheet of paper or film 46 covers the side opening 42. This construction enables the user to remove the lid 32, grasp the doughnut 44 with the sheet 46 between his forefinger and thumb to lift the doughnut 44 out of the dispenser 10.

The construction of the dispenser 10 with sheet 46 serves two purposes.

One purpose is to maintain the freshness of a doughnut packaged in the dispenser 10 before the package is opened. (i.e., lid 32 and doughnut are removed The second purpose is that the fingers do not become greasy since no contact is made with the doughnut by the fingers while the doughnut is being removed from the dispenser.

In the versions of FIGS. 8, 9, a preferred container for dispensing beverage is the standard well-known styrene foam cup. This would permit serving the doughnut in the dispenser 10 mounted on a cup 16 of hot coffee. (Styrene foam is an effective heat insulator.)

There has been described a dispenser for packaging condiments where one package design will accommodate a plurality of standard beverage containers.

The principle of the invention is to mount a dispenser of one product onto a container of another product where the container is available in a variety of sizes and shapes. This principle can be applied to combinations of products other than condiments and beverage such as soaps and soap emulsifiers, etc.

Variations and modifications of the invention may be contemplated after reading the specification and studying the drawings, which are within the scope of the invention For example the dispenser 10 may be manufactured from a variety of materials—polyethylene, polystrene, etc.

It is therefore desired to define the scope of the invention by the appended claims

What is claimed is:

1. A dispenser for containing one product wherein said dispenser is adapted for mounting on a container containing another product, said dispenser comprising:
   a base plate having an outer circular rim;
   said base plate having an inner circular opening concentric with said rim;
   an interior truncated cone having a largest cone rim integrally joined to an edge of said circular opening;
   said interior truncated cone having a cover over a smallest rim of said interior truncated cone;
   said cover having a hole in said cover;
   a truncated outer cone having a smallest rim integrally formed with said outer circular rim of said base;
   said truncated outer cone extending from said base in a same direction as said truncated interior cone;
   said outer truncated cone has an outside surface comprising steps;
   each step comprising a riser surface and a step surface, said riser surface being a circular continuous tapered band concentric with a center line of said base and said step surface being a continuous band parallel to said centerline;
   a lid having a diameter and skirt around an outside rim of said lid;
   said skirt dimensioned to engage a largest rim of said outside truncated cone;
   said outer truncated cone having a side opening;
   a sheet of one of paper and plastic film positioned inside said outer truncated cone and covering said side opening;
   said side opening having a size selected to permit a forefinger and thumb of a user to reach inside said side opening and withdraw said second product from inside said outer truncated cone.

2. The dispenser of claim 1 wherein said container for containing another product is a bottle having a neck with a bottle opening and said dispenser comprises:
   said inner circular opening having a dimension that permits inserting said neck through said inner circular opening into said interior truncated cone and a drinking straw through said hole in said cover into said bottle.

3. The dispenser of claim 1 wherein said one product is a donut with a doughnut hole and said dispenser comprises said smaller cone dimensioned to fit through said doughnut hole.

4. The dispenser of claim 1 wherein:
   said lid has a depression, said depression dimensioned to position one of a CD disk and DVD disk in said depression;
   a cover adhered to said rim of said lid when said disk is deposited inside said depression.

5. The dispenser of claim 1 wherein said second product is a donut and said outer and inner truncated cones are dimensioned to permit depositing said doughnut inside said dispenser.

6. A dispenser for containing one product wherein said dispenser is adapted for mounting on a container containing another product, said container being any one of a beverage bottle having a neck, and a beverage cup having any one of a plurality of standard sizes; said dispenser comprising:
- a base plate having an outer circular rim;
- said base plate having an inner circular opening concentric with said rim;
- an interior truncated cone having a largest cone rim integrally joined to an edge of said circular opening;
- said circular opening having a diameter dimensioned to permit inserting said neck into said interior truncated cone;
- said interior truncated cone having a cover over a smallest rim of said interior truncated cone;
- said cover having a hole in said cover;
- a truncated outer cone having a smallest rim integrally formed with said outer circular rim of said base;
- said truncated outer cone extending from said base in a same direction as said truncated interior cone;
- said outer truncated cone having an outside surface comprising steps;
- each step comprising a riser surface and a step surface, said riser surface of each respective step being a circular continuous tapered band concentric with a center line of said base and said step surface of each respective step being a continuous band parallel to said centerline;
- each said circular continuous tapered band having a smallest and largest diameter selected to permit snugly fitting each said circular continuous tapered band into one of said beverage cups having any one of a plurality of standard sizes; providing that said dispenser is supported on a rim of said beverage cup.

7. The dispenser of claim 6 wherein said container is any one of a beverage cup having an outer circular rim and a beverage bottle,
- said beverage cup having any one of a plurality of standard sizes; said dispenser further comprising:
- said base having a circular ridge formed concentric with said outer circular rim of said base and dimensionally shaped to mate with said outer circular rim of said beverage can.

* * * * *